A. KORONSKI.
COMPUTING MACHINE.
APPLICATION FILED APR. 22, 1913. RENEWED SEPT. 17, 1920.

1,417,924.

Patented May 30, 1922.
7 SHEETS—SHEET 2.

Witnesses
C. E. Kleinfelder
Daniel Webster Jr.

Inventor
André Koronski
By Cyrus N. Anderson
Attorney

A. KORONSKI.
COMPUTING MACHINE.
APPLICATION FILED APR. 22, 1913. RENEWED SEPT. 17, 1920.

1,417,924.

Patented May 30, 1922.
7 SHEETS—SHEET 3.

Witnesses
C. E. Kleinfelder
Daniel Webster Jr.

Inventor
André Koronski
By Cyrus N. Anderson
Attorney

A. KORONSKI.
COMPUTING MACHINE.
APPLICATION FILED APR. 22, 1913. RENEWED SEPT. 17, 1920.

1,417,924.

Patented May 30, 1922.
7 SHEETS—SHEET 6.

A. KORONSKI.
COMPUTING MACHINE.
APPLICATION FILED APR. 22, 1913. RENEWED SEPT. 17, 1920.

1,417,924.

Patented May 30, 1922.

UNITED STATES PATENT OFFICE.

ANDRÉ KORONSKI, OF NARBERTH, PENNSYLVANIA.

COMPUTING MACHINE.

1,417,924.   Specification of Letters Patent.   Patented May 30, 1922.

Application filed April 22, 1913, Serial No. 762,776. Renewed September 17, 1920. Serial No. 410,977.

*To all whom it may concern:*

Be it known that I, ANDRÉ KORONSKI, a citizen of the United States, residing in Narberth, county of Montgomery, State of Pennsylvania, have invented certain new and useful Improvements in Computing Machines, of which the following is a specification.

My invention relates to computing machines, frequently and perhaps most usually referred to as adding machines, and it has for its objects generally to simplify the construction of such machines whereby the cost of manufacture may be reduced to a minimum, while at the same time a high standard of efficiency is maintained. More specifically, my invention relates to computing or adding machines of the key drive type and it aims to provide an improved construction of mechanism intermediate the keys and the accumulating wheels for actuating the latter, whereby the "touch" of said keys is very light and uniform; to provide an improvement in the means for canceling from the accumulating wheels an amount accumulated thereon, that is, for returning the said wheels to zero position; to provide an improved construction of means for preventing the operation of the transfer or carrying over mechanism for transferring or carrying over from a denominational column of lower to the adjacent column of higher order, until after the completion of the accumulating movement of an accumulating wheel caused by the depression of a key; to provide an improved, efficient and simple means acting when a key has been only partially depressed to lock the remaining keys in the column containing the partially depressed key against actuation until after such key has been depressed to its fullest extent and for indicating when such an error has been committed; and also to provide improved means for returning the operative parts of the machine to normal position when, as a result of vibration and jarring in handling or otherwise, said parts have assumed abnormal positions in which all of the keys of each column may be locked against movement in either direction.

Other objects of my invention will be pointed out in the detailed description thereof which follows or will be apparent from such description.

To these ends, my invention comprehends the construction and arrangement hereinafter described and specifically pointed out in the claims and illustrated in the accompanying drawings, in which,—

Figure 11 is an elevational view showing a portion of the transfer mechanism and looking in a direction opposite to that in which Figure 9 is taken;

It will be understood that changes in the details of construction may be made within the scope of the claims without departing from my invention.

Before proceeding with a detailed description of the drawings, attention will be called to the fact that the outside casing with which adding machines are usually provided has been omitted from the drawings as the showing of such casing is not deemed to be in any way essential to an understanding of my invention. Also, instead of showing the machine as a whole, I have shown those views thereof which seem to me to be desirable for the purpose of enabling a clear understanding of my invention.

Referring now to the drawings, 1 designates upright divisional plates which extend longitudinally of the machine and separate the mechanism associated with the respective denominational groups or columns of mechanism. 2 designates key contact levers which are pivoted at their rear ends upon a rod 3 which extends transversely of the machine. One of these levers is associated with each group or column of mechanism employed in the operation of each numeral wheel. These levers extend toward the front of the machine, as shown, and are provided with raised portions 4 at intervals with which a shoulder 5 upon each of the keys 6 contacts when such keys are depressed. I prefer to use but five keys in each column, as illustrated, because an operator can attain greater speed than where nine keys are provided in each column. The keys are guided at their upper end portions in the top plate 7 of the machine and at their lower end portions in brackets 8 preferably formed by cutting and bending out portions of one of the division plates 1, as shown in the drawings.

When the keys are depressed their lower ends contact with the horizontal longitudinally extending stop bars 8' which are supported upon rods 9, of which there are three. These rods extend from side to side of the machine and are supported upon the side frame thereof and upon the longitudinal division plates 1.

Interposed between the stop bars 8' and the brackets 8 are coiled springs 10, the upper ends of which are connected respectively to the lower ends of the keys 6, the lower ends of the said springs resting in seats 11 formed upon the bars 8'. When a key is depressed for the purpose of actuating a lever 2 the associated spring 10 is compressed and by reason of its tendency to expand to the normal position shown in Figure 1 causes an upward movement of the key to normal position immediately upon the removal of the force imposed upon such key, as a result of which it has been depressed. The ends of the keys contact with the bars 8' so that the force of a blow upon the keys is absorbed thereby, and not by the various parts of the mechanism which is actuated or driven by the depression of such key. In this way the jarring and racking of the operative parts of the mechanism are very greatly reduced, if not entirely overcome.

Figure 7:
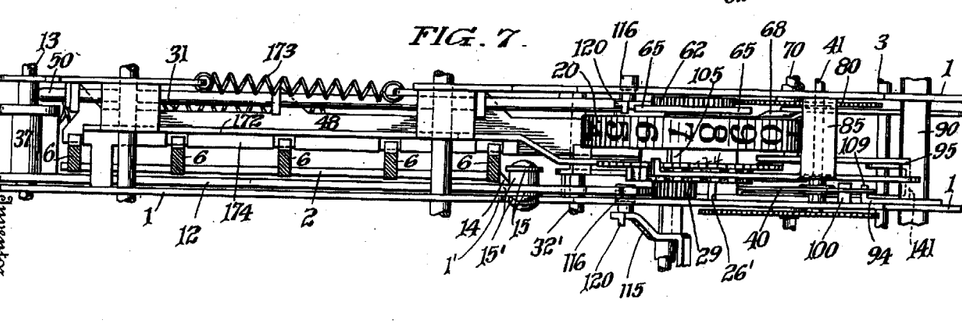
Figure 7 is a horizontal sectional view on the line 7—7 of Figure 1, parts of the structure being omitted.
Figure 8:
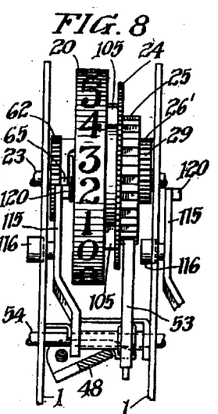
Figure 8 is a transverse sectional view on the line 8—8 of Figure 1 certain parts of the construction being omitted for the purpose of showing the relation of a duplexing lever to the numeral wheel.

By reference to Figure 7, it will be observed that the front end portions of the levers 2 are located in off-set positions with respect to the rear end portions thereof and also out of vertical alinement with the front end portions of the segment levers 12 (sometimes called "column actuators"), which are pivoted at the front of the machine upon a sleeve 37 on a cross rod 13. This non-alinement is secured by the lateral bending of the said levers 2, as indicated at 14 in said Figure 7.

The levers 2 are respectively connected with their cooperating segment levers 12 by means of parallel links 15, said links having detachable connection with the levers 2. The said links are spaced from each other by means of sleeves 15' for the purpose of facilitating the insertion, during the assembling of the machine, of the said levers 2 through the space between the said links in order that the connecting bolts or rivets may be placed readily in the bearing seats between the downwardly projecting fingers 16 and 17 upon the lower edges of the levers 2. These fingers project at some length in order to prevent the displacement of the rivets or bolts at the lower ends of the said links from the seats between the said fingers except under extraordinary conditions.

In case a lever 12 should be accidentally or otherwise depressed, independently of its associated and coacting lever 2, there would be a possibility of displacement of the lower end of the associated link from its seat between the said fingers. To prevent such displacement toward the rear, the rear finger 17 is considerably longer than the front finger 16. Such extra length prevents the possibility of rearward displacement. Forward displacement of the lower end of such link is prevented by the presence of a shoulder 1' on one of the adjacent division plates, there being such a shoulder upon one of the said plates in each of the columns.

The sleeves or washers 15' engage with the said shoulder to prevent sufficient forward motion of the lower end of a link to cause it to be displaced from its seat between the fingers 16 and 17.

In order to prevent lateral vibration of the levers 2 I have provided a downwardly projecting finger 18 situated near the front of the respective segment levers 12, which are also known as "column actuators". The front end portions of the levers 2 are situated between a finger 18 and the opposing cooperating keys 6. The relation of the said levers 2 to the said key 6 and the downwardly projecting fingers 18 is very clearly shown in Figure 4 of the drawings.

The accumulating or numeral wheels 20, each having an elongated hub 22, are revolubly supported upon a rod 23 extending transversely of the machine. An outer annular portion of each of the wheels is secured upon an angular flange 21 formed upon said hub. Rigidly connected to the said hub and in fixed relation to each of the said numeral wheels is a toothed wheel 24, the purpose of which will be hereinafter explained. Also rigidly secured to each of the said hubs and in fixed relation thereto is an internal ratchet wheel 25 which is adapted to be engaged by a driving pawl 26 which is pressed outwardly into engagement with the internal teeth of the said ratchet wheel by means of a spring 27. The driving pawl 26 is pivotally supported upon the rear end of a projection 28 from the gear segment 29 also pivoted upon the transverse rod 23. The segments 29 are each capable of pivotal movement independently of the internal ratchet wheel 25.

30 designates a segment gear upon the rear end of each of the levers 12 which gear is in engagement with the gear 29. Upon depression of a key 6 the shoulder 5 thereof contacts with the corresponding raised portion 4 upon the coacting lever 2 to cause a depression thereof. Such depression through the connecting link 15 causes a corresponding depression of the lever 12. By reason of the engagement of the segment gear 30 with the pivoted gear 29 depression of the lever 12 causes pivotal or revoluble movement of the gear 29 carrying the pawl 26 to the left and causing a corresponding partial revolution of the ratchet wheel 25 and the parts connected therewith. It is desirable in operation that each of the keys be depressed through substantially equal distances regardless of whether the key be a one, a five or any intermediate value. This result is effected by properly proportioning the positions of the connections between the levers 2 and 12 in relation to their length and also by locating the shoulders 5 at different distances above the upper edges of the raised portions 4 upon the levers 2. The relative positions of these shoulders 5 with respect to the upper edges of the levers 2 are very well indicated in Figure 1 of the drawings.

Figure 1:
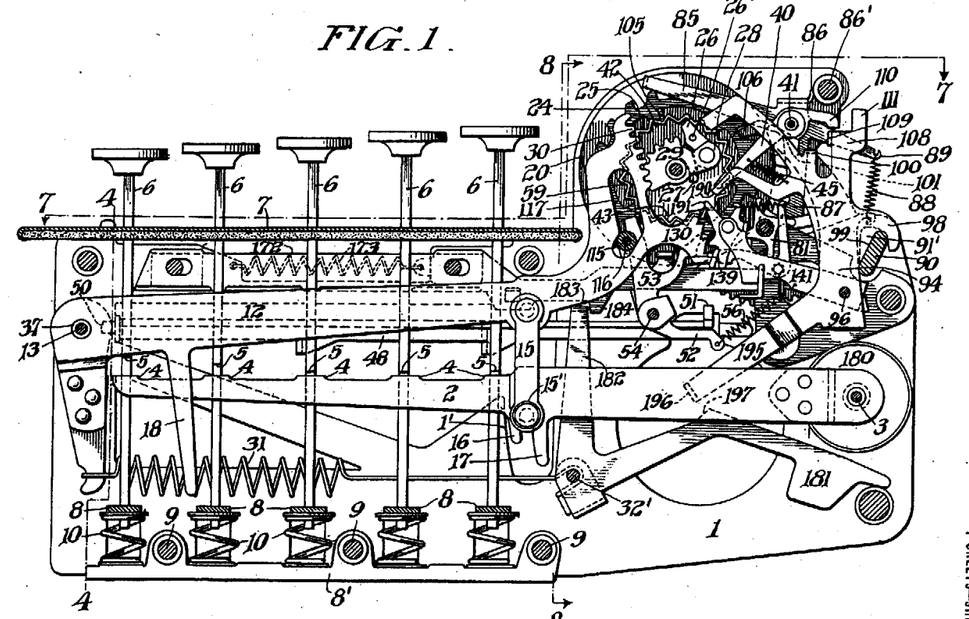
Figure 1 is a longitudinal sectional view of a computing machine embodying my invention, the said view being taken looking toward the left and the operative mechanism being shown in side elevation.
Figure 2:
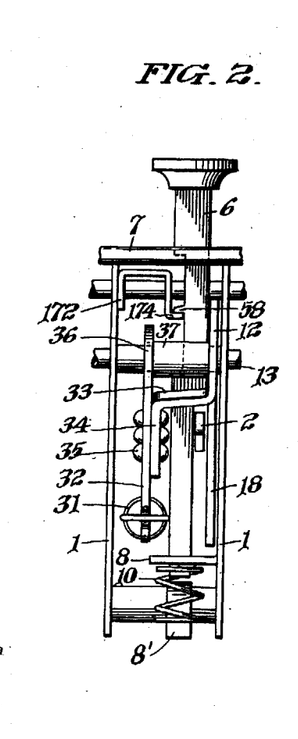
Figure 2 is an end view of a portion of such machine with certain parts shown in Figure 1 omitted.
Figure 3:
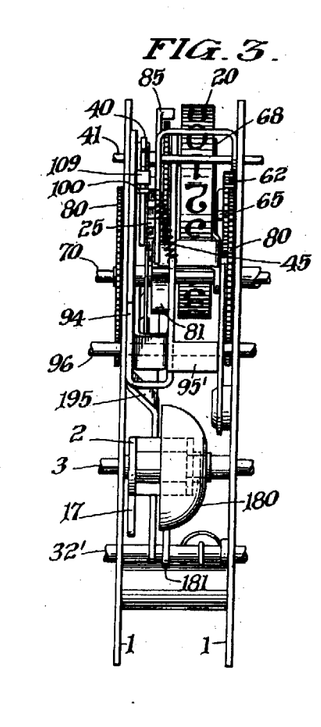
Figure 3 is an end view of a portion of such machine looking toward the front, the outside casing of the machine being removed.

Upon release of a key 6 the segment levers 12 are returned to normal position, which is indicated in Figure 1 of the drawings, by means of coiled springs 31 having connection respectively at one end with depending arms 32 which arms have connection with the front ends of the said levers 12. The other or rear end of each of the said springs is hooked over a rod 32' as shown in Figure 1 of the drawings.

It is apparent that as a segment lever 12 is depressed pivotal movement in a forward direction of an arm 32 is caused which stretches the connected spring 31. The tendency of such spring to return to normal position causes a pivoted upward movement of the lever 12.

In order that a relatively wide bearing for the respective levers 12 may be provided, I extend an integral portion thereof beyond the pivot rod 13 and bend the same laterally as shown at 33 and then again downwardly as shown at 34. The arm 32 is connected to the extended portion 34 by means of rivets 35. The upper end of the arm 32 is pivoted at 36 upon the sleeve 37. The lever 12 and the upper end of the arm 32 are separated from each other by an enlarged portion of sleeve 37.

Each of the numeral wheels is provided with two groups of numerals or denominational units extending from zero to 9.

In order to prevent reverse movement of the ratchet wheel 25 and the parts connected therewith during the operation of the machine, I have provided a lever 40 pivoted at its upper end upon a rod 41. The lower end of the said lever 40 is bent laterally so as to extend interiorly of the ratchet wheel 25 into position to engage the sides 42 of the internal teeth of said ratchet wheel and hold the said wheel against reverse rotation, that is, rotation clockwise in Figure 1. As the said ratchet wheel is rotated in the opposite direction by means of the driving pawl 26 the edge of the laterally extended portion of the said lever 40 slides over the other sides of the respective internal teeth of the said ratchet. The said lever 40 may be regarded as a pivoted pawl for accomplishing the purpose stated.

The lever 40 is held in proper position to engage the internal teeth of the ratchet wheel 25 by means of a coiled wire spring 45.

In order to prevent the overrunning of the accumulating wheels and the parts connected thereto, I have provided bars 48 one of which is associated with each column of keys as indicated. These bars are provided with laterally projecting lugs or ears 49 which have pivotal connection with rods 50 supported upon the frame of the machine. The bars 48 and rods 50 extend longitudinally of the machine, as illustrated.

Figure 4:
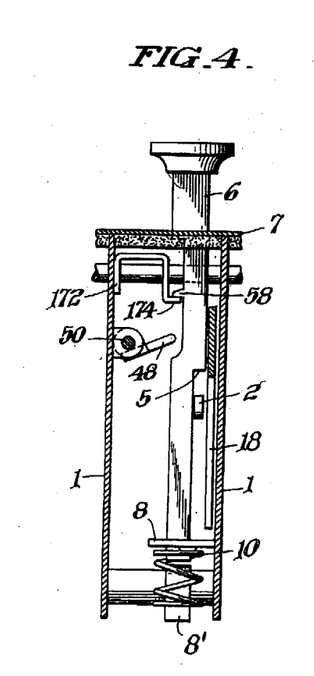
Figure 4 is a transverse section on the line 4—4 of Figure 1.
Figure 5:
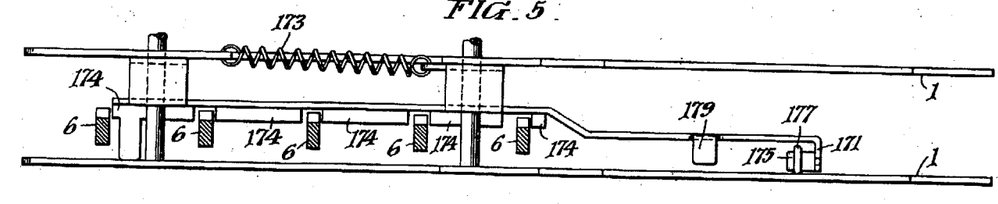
Figure 5 is a horizontal sectional view showing means for locking the keys against operation.
Figure 6:
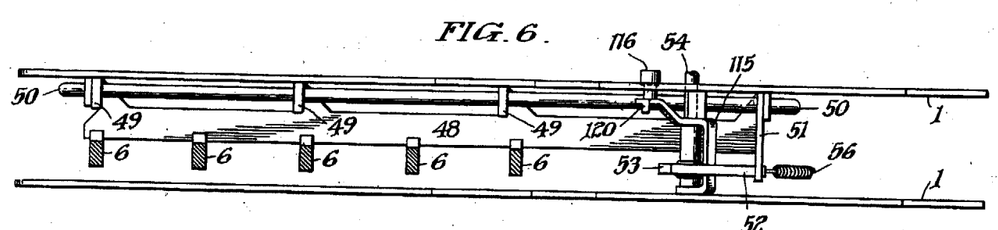
Figure 6 is a horizontal sectional view showing a detail of the mechanism by means of which the keys actuate certain parts of the operative mechanism.

At their rear ends the said bars 48 are each provided with a laterally extending arm 51 which is in contact with the rearwardly extending arm 52 of a lever 53 pivoted upon a rod 54 extending transversely of the machine. The levers 53 (one for each column) are held normally in positions somewhat forward of the ratchet wheels 25 by means of coiled wire springs 56 having connection with the rear ends of the arms 52, as shown in various figures of the drawings. The arms 51 being in contact with the upper edges of the said arms 52 are also held upwardly by said springs so that the longitudinal bars 48 occupy angular positions such as shown in Figure 4 of the drawings.

As any one of the keys in any one of the columns is depressed the lug or ear 58 thereon contacts with the associated bar 48 to cause pivotal movement thereof. Such pivotal movement also causes pivotal movement of its laterally extended arm 51 which in turn causes pivotal movement of a lever 53 in a rearward direction so as to bring its upper end into position to engage the outer teeth 59 of the associated ratchet wheel 25. The positions of these ears or lugs 58 upon the keys 6 are such that they contact with the bars 48 just as the keys are reaching the limit of their downward movement so that the upper end of the lever 53 is brought into position to engage the ratchet wheel just at the proper moment and thereby, while permitting it to move forward the necessary distance, prevents overrunning of the same due to the momentum given to the parts, particularly during rapid operation.

*Transfer or carrying-over mechanism.*

In the operation of computing or adding machines, it is necessary to be able to carry over from one denomination of a lower to the next denomination of a higher order. For this purpose what is known as transfer or carrying-over mechanism is employed. The transfer mechanism consists of a coiled wire spring 60 one portion of which is coiled around a part of the hub 22 situated inside of the flange 21, one end of the said spring being connected to said hub. The opposite end of the said spring is coiled around a portion of the hub 61 of a gear 62 and is connected to such hub. The said hub and gear 61 and 62 are revolubly supported upon the transverse rod 23.

63 designates a stop member integral with the hub 61 and having a stop engaging shoulder 64 which is adapted to engage with stops 66 and 67 upon the ends of an escapement lever 68 pivoted upon a rod 70 extending transversely of the machine. It will be understood that one of these escapement levers is associated with each of the accumulating wheels.

In order to provide a wide bearing for the escapement lever 68, I have formed an extension thereon at its pivoted end and have bent the same into U-shape as indicated at 71. Upon the ends of the arms of the said escapement lever I have provided rolls 72 which are adapted to engage a cam 73 formed upon the annular flange 21. It will be understood that as the hub 22 revolves the cam 73 will cause an oscillating pivotal movement of the escapement lever 68 so as to alternately move one of the stop shoulders 66 and 67 outwardly to disengage the stop 64 on the member 63 from whichever of these stop shoulders it may be in engagement and bring the other one of the said stop shoulders 66 and 67 into position to be engaged by the said stop 64.

Figure 11:
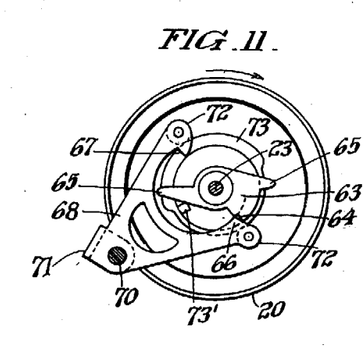
Figure 12:
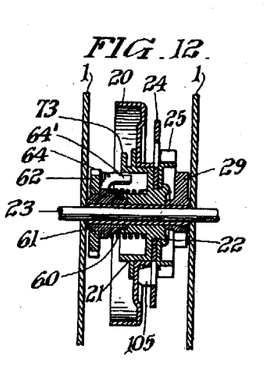
Figure 12 is a transverse sectional view of the numeral wheel and certain connected parts, and also showing the divisional plates between the separate groups of numeral wheels and their actuating mechanisms.
Figure 13:
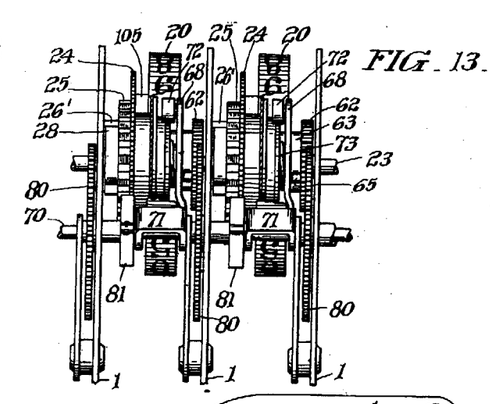
Figure 13 is a view of the rear of a portion of the machine designed to show the relation of the carrying over or transfer mechanism to other parts of the structure.
Figure 14:
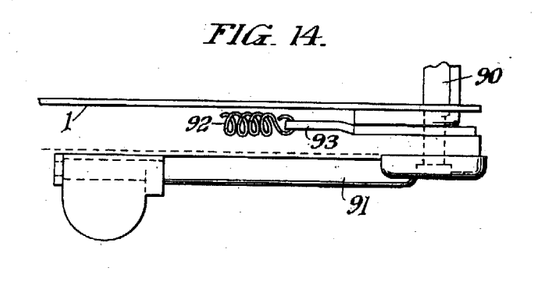
Figure 14 is a top plan view of a portion of one side of the machine including the canceling lever and connected parts.

In the construction shown, the cam is so arranged as to effect a shifting of the escapement lever 68 twice during each revolution of the hub 22 and an accumulating wheel 20 associated therewith. This is necessary by reason of the fact that each of the said wheels is provided with two groups of numerals or denominational numbers from zero to 9 inclusive. Upon the disengagement of the stop 64 from one of the stop shoulders 66 or 67 the spring 60 which is under tension causes a sudden movement of the stop member 63 and the gear 62 in a direction indicated by the arrow in Figure 11 a distance of half a revolution. The gear 62 is in engagement with a gear 80 revolubly mounted upon the transverse rod 70. The number of teeth in the gear 80 is twice that of the teeth in the gear 62 so that a half revolution of the latter causes one quarter of a revolution of the former.

Connected to the said gear 80 is a star wheel 81 having four arms which are adapted to engage the toothed wheel 24, one of which is associated with each of the accumulator wheels. The turning of the gear 80 through a quarter revolution causes a corresponding revolution of the four-pointed star wheel 81.

Figure 17:
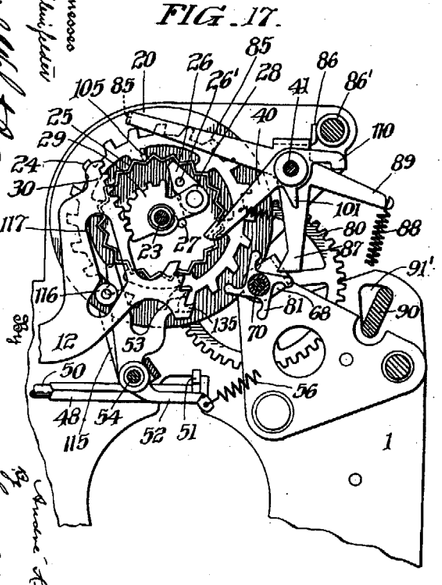
Figure 17 is a transverse sectional view of a portion of the machine showing certain parts of the adding mechanism in detail with certain parts of the mechanism removed.
Figure 18:
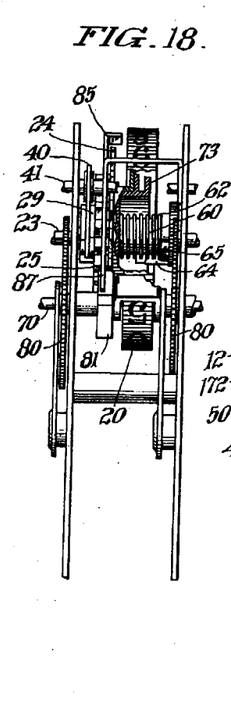
Figure 18 is a view looking toward the left in Figure 17, the numeral wheel being broken away and shown partly in section.
Figure 19:
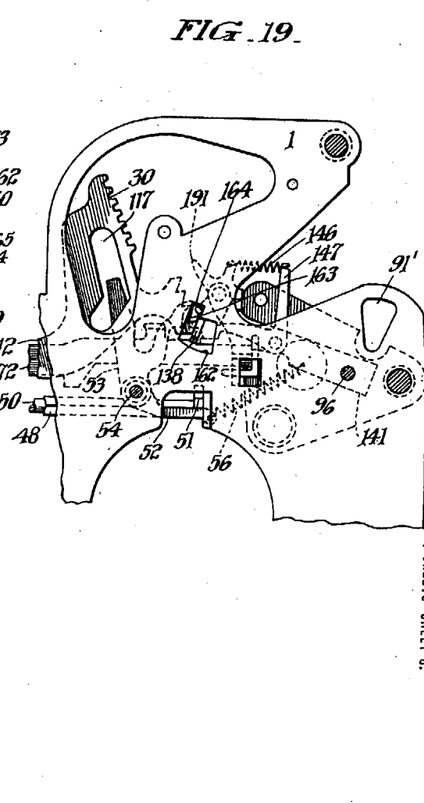
Figure 19 is a longitudinal sectional view of a portion of the machine showing a portion of the mechanism for locking the keys and thereby showing when a key has not been completely depressed.
Figures 20, 21, 22, 23:
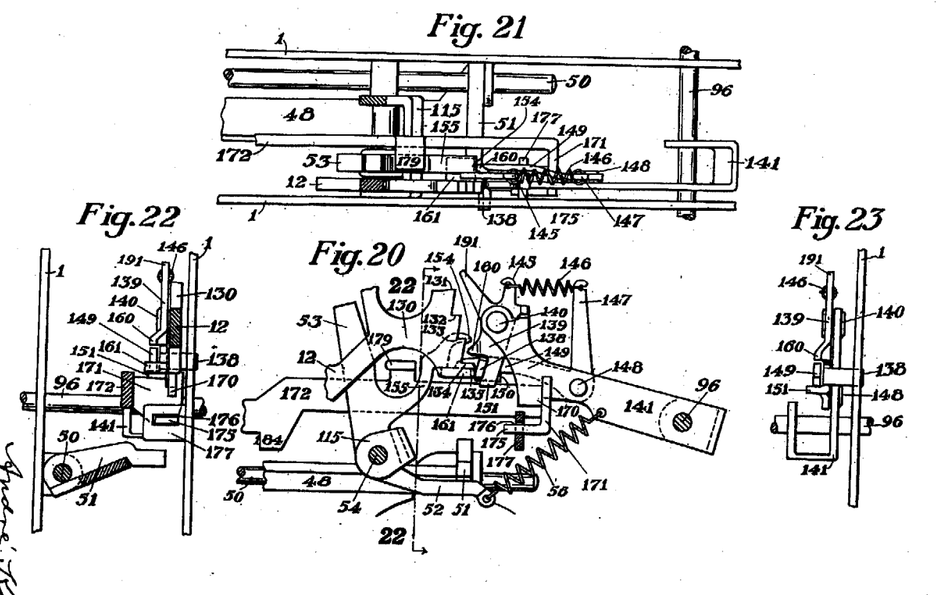
Figure 20 is a longitudinal sectional view of a portion of the machine showing in side elevation certain parts of the mechanism for locking certain of the keys and thereby showing when one of the keys has not been fully depressed.
Figure 21 is a top plan view of the same.
Figure 22 is a transverse sectional view on the line 22—22 of Figure 20, looking toward the right (the part 55 being omitted)
Figure 23 is an edge elevational view of certain parts of the mechanism shown in more or less detail in Figures 20 to 22, depicting the motion of the ear or lug 138 to the division plates 1.

Upon reference to Figure 17 of the drawings it will be observed that the ends of the points of this star wheel are adapted to contact successively with the teeth upon the toothed wheel 24 so that a quarter revolution of the said star wheel causes a one-step movement of the said wheel and a consequent one-step forward movement of its associated accumulating wheel 20.

Let us suppose that we have accumulated upon the accumulator wheel of the extreme right hand column of the machine the amount or number 9 and that we then add to such number the additional number 5 making a total of 14. In adding this the 5 key in the said right hand column is depressed. The depression of such key causes a revolution of the numeral wheel in such column so as to bring a 4 upon such numeral wheel into proper position and during such revolution one of the stops upon the adjacent escapement lever 68 is disengaged from the stop upon the revoluble stop member 63 so that the gear 62 is permitted to move (at the proper time as hereinafter explained) the distance of one-half a revolution, thereby causing a quarter revolution of the gear 80 which is in engagement therewith and a consequent quarter revolution of the four-pointed star wheel 81 associated therewith and with the column of next higher denomination. One of the points of such star-wheel engaging with a tooth upon the toothed wheel 24 of such column of higher denomination causes a partial revolution thereof through a single step so as to bring a number 1 upon such wheel into registry with the sight opening through which the numbers upon the accumulating wheels 20 are seen through the outside casing of the machine. In order to prevent such accumulating wheel of higher denomination from moving a greater distance than the one step as desired, I have provided the stop lever 85 having a lateral projection at its outer end which is adapted to be thrown down into position between two of the teeth upon the said wheel 24. The said lever is pivoted upon the transverse rod 41. Integral with the said lever is a depending arm 87 which is adapted to be engaged by one of the arms of the four-pointed star wheel 81 at the proper instant to throw the said lever 85 downwardly into position to engage the teeth of the said toothed wheel 24 to prevent overrunning of the same and thus accumulating an incorrect amount. The outer forward end of the lever 85 is held upwardly in the normal position shown in Figures 1 and 17 of the drawings by means of a coiled wire spring 88 having connection with a rearwardly extending arm 89 also shown in Figures 1 and 17. To limit the movement of the said lever 85 under the influence of the spring 89, I have provided a lug or ear 86 thereon which is adapted to engage the spacer 86'.

*Canceling mechanism.*

It frequently becomes necessary to clear the machine, that is, to cause revolution of the accumulator wheels from such positions as they may occupy to positions in which the zeros thereon are in view, thus canceling from the accumulator wheels any amount which may have been accumulated thereon.

The mechanism which I have provided for this purpose comprises a transversely extending flat bar 90, with rounded edges, situated at the rear of the machine and having connection at its right hand end with a canceling lever 91. Said bar 90 is supported in slots 91' in the division plates 1, the said slots being shaped so as to permit the necessary pivotal movement of the said bar.

Figure 15:
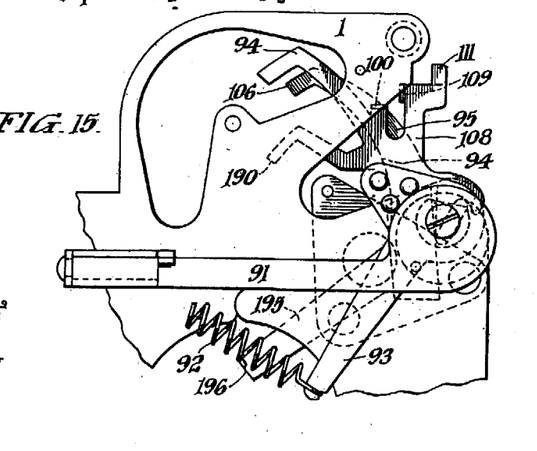
Figure 15 is a side elevation of the same showing additional details of construction.
Figure 16:
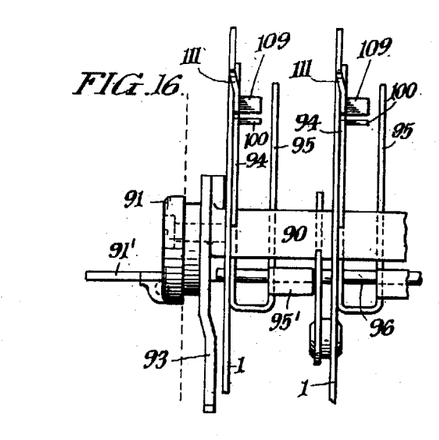
Figure 16 is an elevational view looking toward the left in Figure 15.

The bar 90 and the canceling lever 91 are held in the positions shown in Figure 15 by means of a spring 92 having engagement with a downwardly and forwardly extending arm 93. The opposite end of the said spring is connected with any other portion of the machine. The said bar 90 is in engagement with a plurality of lever arms 94 and 95 associated with each denominational group of mechanism, which lever arms are pivoted upon a transverse bar 96. In the constructions shown the adjacent lever arms 94 and 95 are formed by bending a flat piece of metal into general U-shape, as indicated in Figure 16 of the drawings.

It will be understood, however, that these lever arms 94 and 95 may be separate members pivoted upon the rod 96. It will be observed that the arm 94 is provided with a rearwardly and downwardly extending hook-like projection 98 (see Figure 1) and that the front side of the transverse bar 90 rests against a shoulder or seat 99 formed upon the said lever arm 94 as shown in the drawings.

The lever arm 94 is longer than the arm 95, as will appear from an examination of Figures 1 and 15, and at its upper end is provided with an inwardly and laterally extending projection which is adapted to engage the pin 26' on the driving pawl 26 to cause its disengagement from the internal teeth of the ratchet wheel 25. This occurs when the canceling lever 91 is depressed so as to cause movement of the lever arms 94 and 95 forwardly about their pivot rod 96.

The lever arm 94 is also provided with a laterally extending lug or ear 100 which is adapted to engage with a finger 101 projecting from the ratchet wheel holding lever 40 and causing pivotal movement of the said lever 40 so as to disengage the outer free end of the same from the internal teeth of the ratchet wheel 25. Such ratchet wheel together with the accumulator wheel 20 and the toothed wheel 24 are then free to rotate in a reverse direction until the zeros on such numeral wheels have reached positions in alinement with the sight openings. The reverse rotation is stopped at such times by reason of the contact of one of the lugs or ears 105 upon the toothed wheel 24 with the upper inwardly extended end 106 of the lever arm 95. There are two of these lugs or ears 105 situated diametrically opposite from each other. The lever arm 94 is provided with an upwardly extending projection 108 having a laterally extending ear 109 thereon with which a rearwardly extending stop arm 110 contacts whereby the upward pivotal movement of the ratchet wheel holding arm or pawl 40 is limited. Forward movement of the lever arms 94 and 95 is limited by the contact of a stop projection 111 thereon with the frame of the machine.

The reverse movement of the several accumulator wheels and their connected parts upon the hub 22 are caused by the spring 60 heretofore described. The springs are at all times under sufficient tension to cause a reverse movement of rotation of the accumulator wheels associated with the respective springs to positions in which a zero is in register with the sight opening. It will be noticed that each of these springs serves a double function, namely, the effecting of the carrying-over operation as hereinbefore described and in addition thereto the reverse rotative movement of the respective numeral wheels and the parts connected thereto on the respective hubs 22, also previously described.

It will be noted that the canceling operation of the machine is effected very simply and readily merely by the depression of the canceling lever 91, such lever being returned and held in normal position by the operation of the coiled spring 92 having engagement with the lever arm 93.

*Duplexing mechanism.*

In machines of this character, as is well known, there is a liability to add incorrectly in case two keys in adjoining columns are struck by the operator at the same time unless some means is provided for delaying the operation of the transfer or carrying-over mechanism from a column of lower to the next column of higher denomination until after the stroke of the key has been completed.

If the carrying-over were effected during the rotation of the numeral wheels due to the depression of the keys the amount carried over would be swallowed up by the rotation of the numeral wheel of higher denomination and would be lost. For the purpose of preventing such carrying-over while the accumulator wheels are being rotated by the depression of the keys, I have provided an arm 115 pivoted upon the cross rod 54. The said arm is provided with a cam roll 116 which is situated in the cam slot 117. The upper end of the lever is provided with a projection 120 which is adapted to be moved into position by means of the cam slot 117 to be engaged by the opposite end 65 of the revoluble member 63 and to prevent rotation thereof and thus prevent the carrying-over operation until after the completion of the key stroke.

Figure 9:
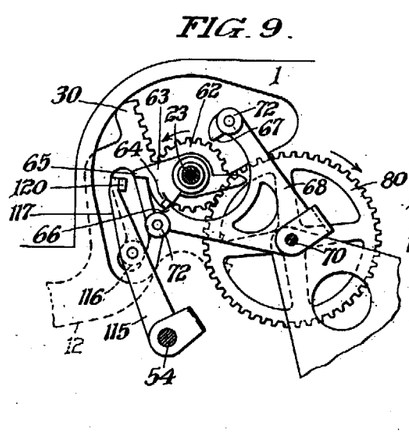
Figure 9 is a detail view showing in side elevation certain parts of the mechanism including the carrying over or transfer devices.
Figure 10:
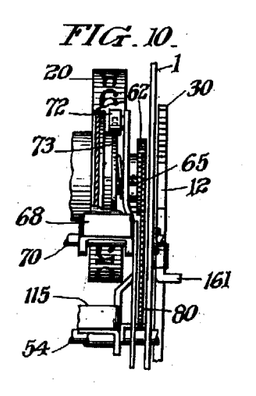
Figure 10 is an elevational view looking toward the left of Figure 1.

Upon reference to Figure 9 it will be noted that the shape of the cam slot 117 is such that when a gear segment lever is in normal elevated position the cam roll 116 is situated in the lower forwardly extended end portion of the said slot. The arm 115 is thus held in such position that its upper end is out of the path of movement of the opposite ends 65 of the revoluble member 63 which is a part of the transfer mechanism. When, however, a lever 12 is depressed the cam slot 117 being in engagement with the cam roll 116 causes a rearward pivotal movement of the arm 115 so that its upper end is carried into the path of movement of one of the ends 65 of the revoluble member 63, as heretofore stated.

*Key-locking and error-indicating mechanism.*

In case the operator in striking a key should fail to depress it to the full extent as he should, it is desirable that some means should be provided which would indicate such failure and which also would prevent the depression of other keys in the same column until after such key has been depressed to its full extent as it should be.

I have provided such mechanism and will now describe the same, referring particularly to Figures 1 and 19 to 23.

The rear ends of the segment levers 12 are each provided with a rearwardly extending portion 130 having shoulders 131, 132, 133 and 134 formed in its rear edge.

The lower edge of each projecting portion 130 is provided with a rearwardly extending contact lug 135 which projects beyond the line of the outer rear edges of the shoulders 131—134. The rear end of the contact lug 135 is normally in engagement with a lateral projection or lug 138 extending from the side of the lower end portion of a lever 139 pivoted upon a pivot 140 secured upon the inner front end of a lever 141 pivoted upon the cross rod 96. The said lever 139 is provided with an upwardly extending projecting finger 145 with which one end of a coiled wire spring 146 is connected, the other end of the said spring being connected with the upwardly extending arm 147 of a bell crank lever pivoted at 148 upon the said lever 141. The other arm 149 of the said bell crank lever extends forwardly and is provided with a hook or shoulder 150 which is adapted to engage with the ear or lug 151 upon the lower end of the lever 139. The ear or lug 151 extends in a direction opposite to that of the projection 138. The engagement of the hook or shoulder 150 with the ear or lug 151 occurs as the key reaches the limit of its downward movement and as the depressed gear segment lever 12 reaches the limit of its downward movement. It will be recalled that the lever 53 of any column is moved rearwardly about its pivot rod 54 during the completion of the downward movement of any depressed key in said column. The rear end 154 of the finger 155, which is integral with the lever 53, contacts with a cam projection 160 formed upon and bent to a position laterally of the main body of the pivoted lever 139 and causes rearward pivotal movement of the said lever so that the hook or shoulder 150 upon the arm 149 may engage with the ear or lug 151, and hold the lever 139 in rearward position so that the projection or lug 138 thereon is not in position to engage with the shoulders 131—134 as the latter are moved upwardly. Such hook or shoulder 150 remains in engagement with such ear or lug 151 until the segment lever returns to its normal elevated position. At this time an ear or lug 161 upon the lower rear end of the projection 130 engages the forward end of the arm 149 and causes movement of the same together with the integral arm 147 about the pivot rod 148 to disengage the shoulder 150 from the projection 151 and thereby permit the spring 146 to cause pivotal movement of the lever 139 so as to bring the projection or lug 138 again into contact with the contact lug or projection 135.

It will be observed that the said projection 138 extends through an irregularly shaped angular opening 162 formed in one of the adjacent division plates 1. When the segment lever is in elevated normal position, as shown, for instance in Figure 19, the projection 138 is situated between the contact lug 135 and the rear edge of the opening 162, being also situated underneath the lower edge of a shoulder 163 at the upper edge of the said opening. The said shoulder extends only partially forward across the said opening so that the said opening is provided in effect with an extension 164 into which the projection 138 may be moved as will be hereinafter explained. Normally, however, the said projection is situated below the said extension 164 of the opening, being held in such position by means of a spring 56 which is connected to the lever 141 and to the rear end of the projection 52 and by the contact lug 135. It will be understood that this mechanism is duplicated in each column.

In the operation of the machine the segment lever 12 of each denominational group or column is permitted to return upwardly to normal position after having been depressed through the full extent of its movement by reason of the fact that the shoulder 150 which has engaged the projection 151 holds the lever 139 in a rearward position during such upward movement of the segment lever.

In case a key in any column is only partially depressed it will be remembered that the ear or lug 58 thereon will not contact with the adjacent bar 48 and that in consequence the arm 51 upon the said bar will remain stationary thus preventing actuation of the arm 52. The said arm 52 remaining stationary, it is apparent that the lever arm 53 to which the same is connected will also remain stationary. In other words, unless pivotal movement of the bar 48 is caused by contact of an ear or lug 58 upon a key the lever arm 53 will not be actuated. The result will be that the contact lug or projection 135 having been moved to a position below the lateral projection 138 near the lower end of the lever 139 such lever will be released and will be moved forward by the action of the spring 146 so that the lower edge of the projection 138 will be swung forward into position to engage one of the shoulders 134, 133, 132 or 131, depending upon the distance through which the key was depressed. The engagement of any one of these shoulders with said projection would prevent the return to normal position of the partially depressed segment lever. Such engagement, however, does effect a sufficient upward movement of the lever 141 in opposition to the action of the spring 56 to disengage the shoulder or hook 170 on said lever 141 from a laterally extended portion 171 upon the rear end of the slidable lock bar 172, releasing the latter and thereby permitting it to move forwardly under the influence of the spring 173. The said bar 172 is provided with laterally extended flanges 174 situated at intervals upon its lower edge. When the said bar 172 moves forwardly such flanges pass underneath the ears 58 upon the undepressed keys and above the ear 58 upon the depressed key. The undepressed keys are thereby prevented from being depressed until after the parts have assumed normal position, while the partially depressed key is prevented from rising by the contact of the upper edge of the ear 58 thereon with the underneath side of one of the flanges 174.

The partially depressed key cannot return to normal position until after it has been completely depressed and the correct number thereby accumulated upon the proper accumulating wheel.

At the time that the lever 141 is slightly raised as above stated, the projection 138 moves upwardly into the extended portion or notch 164.

The laterally extended portion 171 upon the rear ends of the bars 172 is provided with a forwardly extending projection 175 which occupies an opening 176 in a projecting lug 177 formed by cutting and bending out a portion of one of the divisional plates 1 which separate the groups of denominational mechanism. When, after an error such as above described, a key is fully depressed so as to cause a pivotal movement of the stop arm 53 in the manner hereinbefore described, the forward edge of the latter engages a lateral stop projection 179 upon the bar 172 and pushes it backward to normal position, allowing the hook or shoulder 170 on lever 141 to engage the part 171.

As a further means of indicating to the operator that he has failed to depress a key to its fullest extent as he should have done, I have provided means for ringing a bell 180 located at the rear end of each denominational group or column of mechanism. This means comprises a knocker arm 181 which is integral with an upright arm 182 pivoted upon the cross rod 32'. The upper end of the said arm is provided with a lug or ear 183 which is adapted to be engaged by a downwardly extending lug or ear 184 upon the lower edge of a locking bar 172. When the shoulder or hook 170 is disengaged from the laterally extended portion 171 as above described, the locking bar 172 is pulled forward suddenly, thereby causing the downwardly extending lug or ear 184 to strike the upper end of the lever arm 182 and cause the knocker arm to strike an associated bell and ring the same. When the parts have returned to normal position after the key has been depressed to its full extent, the weight of the knocker arm 181 causes the lever arm 182 to return to normal position.

*Resetting mechanism.*

In handling the machine for shipping purposes or otherwise, the probabilities are that the segment levers 12 would become depressed to a greater or less extent. In other words, partial movements of the said levers will be effected even though the operator has not depressed a key. Such partial movements would occasion the locking of all of the keys in the columns in which such segment levers have become partially depressed as has been above described. In order to release these keys and to reset the various parts of the mechanism, I provide fingers 190, projecting forwardly and downwardly from the lever arms 94, the ends of which are adapted to engage a trip finger 191 extending upwardly from each of the locking levers 139. I also project forwardly and downwardly from the lower ends of the said lever-arms 94 resetting arms 195 adapted to engage shoulders 197 intermediate the ends of the knocker arms 181.

It will be understood that when the canceling lever 91 is depressed the lever-arm 94 is turned about its pivot. At such time the inner ends of the fingers 190 engage the tripping fingers 191 to cause pivotal tripping movement of the levers 139 to thereby disengage the projection 130 at the rear end of the segment lever 12. At the same time the lateral projections 196 upon the resetting arms 195 engage the shoulders 197 either upon one or all of the knocker arms (depending upon whether one or all of them have been lifted by the action of the locking bars 172 thereon) to return the same to normal position, thus causing the projections at the upper ends of the lever-arms 182 to contact with the lugs 184 and return the locking bars to normal position to release the keys which have been locked thereby.

It will be understood that although the singular number is employed in describing certain parts of the mechanism of a column, such parts are duplicated in the different denominational groups of mechanism.

I claim:—

1. In a computing machine, the combination of a key actuated lever, said lever having fingers depending from its lower edge, a column actuator, and a link consisting of members situated upon the opposite sides of the said actuator and the said key actuated lever, the lower ends of the said members embracing the said lever, and the means connecting the said lower ends being seated between the said depending fingers.

2. In a computing machine, the combination of a series of keys, a lever adapted to be actuated by the said keys, means co-operating with said keys for preventing lateral movement of the said key actuated lever, a column actuator, a connection between the said key actuated lever and the said column actuator, and a numeral wheel adapted to be actuated by the said column actuator.

3. In a computing machine, the combination of a series of keys, a lever adapted to be actuated directly by the said keys, a column actuator, means arranged in parallel relation to the said series of keys upon the opposite side of the said key actuated lever from the said keys and cooperating with the latter to prevent lateral movement of said key actuated lever, a connection between the said key actuated lever and the said column actuator, and a numeral wheel adapted to be actuated by the said column actuator.

4. In a computing machine, the combination of a pivoted lever, a series of keys each of which is adapted to contact with the said lever to cause pivotal movement thereof, a column actuator having an arm depending therefrom upon the opposite side of the said lever from the said series of keys and preventing lateral movement of the said lever, and a connection between the said lever and the said column actuator.

5. In a computing machine, the combination of a lever pivoted at its rear end, a series of keys having shoulders adapted to contact with the forward end portion of the said lever to cause pivotal movement thereof, a column actuator pivoted at its front end, a link connected to the said lever near its center, and a finger depending downwardly from the said column actuator near its front end, such finger being located upon the opposite side of the front end portion of the said lever from the said series of keys, whereby the said lever is held between the said finger and the said keys and prevented from moving laterally.

6. In a computing machine, the combination of a series of keys, a lever adapted to be actuated by each of the said keys, the said lever being provided with downwardly extending fingers spaced from each other, the rear finger being of greater length than the front finger, a column actuator, and a link having its lower end provided with a journal seated between the said fingers and having its upper end pivotally connected to the said column actuator.

7. In a computing machine, the combination of a series of keys, a pivoted lever adapted to be actuated by each of the said keys, the said lever being provided with depending fingers, a column actuator, a link having pivotal connection at its upper end with the said column actuator and its lower end being provided with a journal seated between the said fingers, the rear finger being of greater length than the front finger to prevent rearward displacement of the lower end of the said link, and means independent of the said lever for preventing forward displacement of the lower end of said link.

8. In a computing machine, the combination of a series of keys, a lever pivoted at its rear end and adapted to be actuated by any one of said keys, the forward end portion of the said lever with which the said keys are adapted to contact being out of alinement with the column actuator, the column actuator pivoted at its front end, a connection between the said lever and the said column actuator, and a numeral wheel adapted to be actuated by the said column actuator.

9. In a computing machine, the combination of a numeral wheel, a series of keys, means intermediate the said wheel and the said keys for actuating the said wheel, a pivoted bar arranged in parallel relation to said keys and adapted to be actuated thereby, the said bar having a laterally extended finger, and a lever adapted to be actuated by the said finger and moved into position to prevent over-rotation of the said numeral wheel when the same is actuated by the depression of any one of the keys of the said series.

10. In a computing machine, the combination of a numeral wheel, a ratchet wheel having rigid connection therewith, a series of keys, and means intermediate said keys and the said numeral wheel for actuating the latter upon the depression of any one of the said keys, a pivoted bar extending longitudinally of the machine and arranged in parallel relation to the said series of keys, each of the said keys being provided with means for causing pivotal movement of the said bar when such key is depressed, the said bar having a laterally extending finger and a pivoted lever actuated by the said finger when the said bar is moved about its pivot to engage the said ratchet wheel to prevent over-rotation of the said numeral wheel.

11. In a computing machine, the combination of a numeral wheel, a ratchet wheel having rigid connection with the said numeral wheel, a lever arm adapted to engage the said ratchet wheel, the said lever arm having an arm extending rearwardly from its lower end, means for holding the said lever arm normally out of engagement with the said ratchet wheel, a series of keys, means intermediate the said keys and the said numeral wheel for actuating the latter, a pivoted bar, means upon each of the said keys for causing pivotal movement of the said bar when any key is depressed, the said bar having means connected thereto for engagement with the said rearwardly extending arm to cause pivotal movement of the said lever-arm into engagement with the said ratchet wheel to prevent over-rotation of the said numeral wheel.

12. In a computing machine, the combination of a numeral wheel, means for actuating the same, a numeral wheel of higher denomination situated adjacent thereto, a revoluble stop member, a motor spring having connection with the numeral wheel of lower denomination and with the said revoluble stop member, a pivoted two-armed release and stop device having its arms situated upon the opposite sides of the said revoluble stop member, the stops upon the said arms being adapted to be alternately engaged by the said revoluble stop member, a cam upon the said numeral wheel of lower denomination for causing movement of the said pivoted stop member to cause alternating engagement and disengagement of the said revoluble stop member therewith, and means intermediate the said revoluble stop member and the numeral wheel of higher denomination to cause a one-step revolution of the latter upon the releasing of said revoluble stop member.

13. In a computing machine, the combination of a numeral wheel of lower denomination, means for actuating the said numeral wheel, a numeral wheel of higher denomination, toothed wheels having rigid connection with the said numeral wheels, a revoluble stop member, a motor spring having connection with the said numeral wheel of lower denomination and with the said revoluble stop member, means including a cam whose face is adapted to operate a two-armed release, the arms of which operate alternately for releasing the said revoluble stop member and permitting the said spring to cause actuation thereof, a star wheel having operative connection with the said revoluble member, the said star wheel being adapted to engage the toothed wheel associated with the numeral wheel of higher order and cause a one-step rotation thereof upon the release of the said motor spring.

14. In a computing machine, the combination of a numeral wheel of lower denomination, means for actuating the same, a numeral wheel of higher denomination, toothed wheels having rigid connection with the respective numeral wheels, a gear in axial alinement with the said numeral wheels and having a stop member thereon, a motor spring having connection with the said numeral wheel of lower denomination and with the said gear wheel, the said motor spring being adapted to be placed under tension by the said numeral wheel of lower denomination, an escapement lever for engaging and disengaging the said stop member to permit successive half revolutions of the said gear wheel, a cam upon the numeral wheel of lower denomination for operating the said escapement lever, a second gear with which the first-named gear is in engagement, the said second gear having twice as many teeth as the first-named gear, whereby a half revolution of the latter causes a quarter revolution of the former, a star wheel having connection with the said second gear and being in alinement with the toothed wheel associated with the numeral wheel of higher denomination and adapted to engage the same during each of its quarter revolutions to cause a one-step movement thereof and of the numeral wheel of higher denomination to effect a transfer or carrying over from the numeral wheel of lower to the numeral wheel of higher denomination.

15. In a computing machine, the combination of a numeral wheel of lower denomination, means for actuating the same, a numeral wheel of higher denomination, toothed wheels associated with the respective numeral wheels, a motor spring adapted to be placed under tension by the numeral wheel of lower denomination, mechanism intermediate the said spring and the numeral wheel of higher denomination, means associated with the numeral wheel of lower denomination for successively releasing the said spring, the said intermediate mechanism including a four-pointed wheel adapted to be turned through a distance of one-quarter revolution during each period of release of the said spring, and one of the points of the said wheel engaging a tooth upon the toothed wheel associated with the numeral wheel of higher denomination, to cause a one-step rotation of the said toothed wheel and its associated numeral wheel.

16. In a computing machine, the combination of a numeral wheel of lower denomination, means for actuating the same, a numeral wheel of higher denomination, toothed wheels associated with the respective numeral wheels, a motor spring adapted to be placed under tension by the numeral wheel of lower denomination, mechanism intermediate the said spring and the numeral wheel of higher denomination, means associated with the numeral wheel of lower denomination for successively releasing the said spring, the said intermediate mechanism including a four-pointed wheel adapted to be turned through a distance of one-quarter revolution during each period of release of the said spring, one of the points of the said wheel engaging a tooth upon the toothed wheel associated with the numeral wheel of higher denomination, to cause a one-step rotation of the said toothed wheel and its associated numeral wheel, a pivoted lever for engaging the said toothed wheel, the said lever having an arm extended beyond its pivot and adapted to be engaged by another arm of the said four-pointed wheel, such engagement causing movement of the said lever into engagement with the said toothed wheel simultaneously with its actuation to prevent overrunning of the said numeral wheel of higher denomination.

17. In a computing machine, the combination of a numeral wheel of lower denomination, a column actuator therefor, the said actuator having a crooked slot therein, a numeral wheel of higher denomination, transfer mechanism interposed between the said numeral wheels of lower and higher denominations, and a lever-arm actuated and controlled by the said slot for preventing operation of the said transfer mechanism until after the said column actuator has completed the actuation of the said numeral wheel of lower denomination.

18. In a computing machine, the combination of a numeral wheel of lower denomination, a column actuator therefor having a cam slot therein, a numeral wheel of higher denomination, transfer mechanism interposed between the said numeral wheels of lower and higher denomination for effecting a transfer or carrying over from the column of lower to higher denomination, the said mechanism including a motor spring adapted to be placed under tension by the numeral wheel of lower denomination, means associated with the said numeral wheel of lower denomination for releasing the said spring, and means actuated by the said cam slot for preventing the operation of the said spring after having been released until the completion of the actuation of the said numeral wheel of lower denomination.

19. In a computing machine, the combination of a numeral wheel of lower denomination, a column actuator therefor having a cam slot therein adjacent to its rear end, a numeral wheel of higher denomination, transfer mechanism interposed between the said numeral wheels of lower and higher denominations, the said mechanism including a revoluble member having a stop thereon and being also provided with projections, a motor spring having connection with the said numeral wheel of lower denomination and with the said revoluble member, an escapement lever for engagement with the stop on said member, means associated with the said numeral wheel of lower denomination for causing movement of the said escapement lever to cause alternate engagement and disengagement of the same with the said stop to release the said spring at intervals, and means moved into engagement with one of the said projections upon the revoluble member during each operation of the said column actuator to prevent the operation of the said motor spring to actuate the numeral wheel of higher denomination until after the completion of the accumulating operation of the numeral wheels.

20. In a computing machine, the combination of numeral wheels, internal ratchet wheels having connection respectively with the said numeral wheels, column actuators, driving pawls adapted to engage the internal teeth of the said ratchet wheels and to be driven by the said column actuators to cause forward revolution of the said numeral wheels, a holding pawl in engagement with the teeth of the said ratchet wheel and normally acting to prevent reverse revoluble movement thereof, pivoted lever-arms, means for causing pivotal movement of the said lever arms to disconnect the said pawls from the said ratchet wheels, and the said lever arms having means for causing disengagement of the said holding pawls from the said ratchet wheels, motor springs under tension for causing reverse revoluble movement of the said numeral wheels upon the releasing of the said driving and holding pawls, and means for limiting the reverse revoluble movement of said numeral wheels.

21. In a computing machine, the combination of a series of keys, a column actuator, a numeral wheel, means interposed between the said column actuator and the said numeral wheel to cause revoluble movement of the latter upon movement of the said column actuator in one direction, a holding pawl normally holding the said numeral wheel against reverse revoluble movement, a locking bar for locking the said keys against depression in case a column actuator has been partially depressed, and means for disconnecting the said numeral wheel from the said column actuator and releasing the said holding pawl to permit reverse revoluble movement of the said numeral wheel and simultaneously moving said locking bar to unlocking position.

22. In a computing machine, the combination of a plurality of series of keys, column actuators, numeral wheels, means interposed between the respective numeral wheels and column actuators whereby movement of the latter in one direction causes revoluble movement of the said numeral wheels, means for holding the said numeral wheels against reverse revoluble movement, locking bars associated with the respective series of keys, means for retaining the said locking bars in normally unlocking position, means for releasing the said retaining means by return movements of the said column actuators after only a partial depression thereof, means for causing movement of the said locking bars into locking position with respect to the keys, means for returning the said locking bars to unlocking position, and means for disconnecting the said column actuators from the said numeral wheels and releasing the holding means for said numeral wheels to permit reverse revoluble movement thereof and for simultaneously actuating the means for returning the said locking bars to unlocking position.

23. In a computing machine, the combination of a series of keys, a column actuator, a numeral wheel adapted to be actuated by the said column actuator, means for preventing said numeral wheel from over-running, a locking bar, a spring-pressed lever for holding the said locking bar in normally unlocking position, a pivoted member supported upon the said lever, means upon the said column actuator for engaging the said member upon upward movement after only a partial depression to effect pivotal movement of the said lever to release the said locking bar, means actuated by the complete depression of a key, to cause pivotal movement of the said member out of position to be engaged by the said means upon the said column actuator, and means for retaining the said member in such position until after the actuator has returned after a complete depression to its normal position.

24. In combination, a numeral wheel of a lower denomination, a numeral wheel of the next higher denomination, a spring tensioned by said numeral wheel of lower denomination, means controlled by said numeral wheel of lower denomination for releasing said spring at certain intervals, a toothed wheel attached to said numeral wheel of next higher denomination, a star wheel normally out of engagement with said toothed wheel and means for engaging said star wheel with said toothed wheel so as to cause a one step rotation of said numeral wheel of next higher denomination.

25. In combination, an adding mechanism, a column actuator and a series of manually operated keys forming part thereof, a rack integral with said column actuator, a pawl engaging said rack, said pawl being pivoted to a latch which normally holds a key locking bar in unlocking position, means whereby the action of said rack and pawl unlocks said key locking bar when any of said keys are not depressed to their fullest extent and locks all the keys against depression except that one which was partially depressed, and means for returning said key locking bar to its unlocking position when the partially depressed bar is fully depressed.

26. In combination, an adding mechanism comprising a series of keys, a lever actuated thereby and a numeral wheel rotated by said lever, means for preventing said numeral wheel from over-running, a rack integral with said lever, a bar adapted to lock said series of keys at certain times, a latch for holding said lock bar in its unlocking position, a pawl pivoted to said latch and adapted to slip over the teeth of said rack on the down stroke of said lever but which is engaged by said rack to release said latch from said lock bar and release the same when said lever is not actuated to the full extent of the key depressed, a second latch pivoted on said first named latch for holding said pawl out of engagement with said rack on the upward stroke of said lever after said lever has been depressed to the full extent of the number on the key depressed, means integral with said means to prevent over-running for rotating said pawl to where it is held by said second latch and means for releasing said second latch from said pawl when said lever is at the last part of its up stroke to allow said pawl once more to get into engagement with said rack on said lever.

27. In combination, an adding mechanism comprising a series of keys, a numeral wheel, means for preventing said numeral wheel from over-running and means intermediate said keys and said numeral wheel for adding the amount on the key onto said numeral wheel, ratchet teeth forming part of said intermediate means, a pawl adapted to engage said ratchet, said pawl being mounted on a latch adapted to engage a lock bar which is capable of locking said keys when one of them is incorrectly operated and hold said lock bar in unlocking position, a second latch mounted on said first named latch and adapted to hold said pawl out of engagement with said rack on the idle stroke of said intermediate means, and means actuated by said means for preventing over-running of said numeral wheel for returning said locking bar to its unlocking position after it has been unlocked by said first named latch.

In testimony that I claim the foregoing as my invention, I have hereunto signed my name this 14th day of April, A. D. 1913.

ANDRÉ KORONSKI.

In the presence of—
CARRIE E. KLEINFELDER,
GEO. M. HENRY.